United States Patent [19]

Petrofsky et al.

[11] Patent Number: 4,657,769

[45] Date of Patent: Apr. 14, 1987

[54] METHOD OF MANUFACTURING FROZEN BAGEL DOUGH PRODUCTS

[75] Inventors: David Petrofsky, 14 Bal Harbour; Robert Petrofsky, 1393 Orchard View Dr., both of St. Louis, Mo. 63146

[73] Assignees: Leonard Petrofsky; Robert Petrofsky; David Petrofsky; Jerry Shapiro, all of St. Louis, Mo.

[21] Appl. No.: 704,168

[22] Filed: Feb. 22, 1984

[51] Int. Cl.[4] .............................................. A21D 6/00
[52] U.S. Cl. .................................... 426/549; 426/499; 426/653
[58] Field of Search ............... 426/549, 654, 327, 391, 426/393, 653, 444, 496, 497, 499

[56] References Cited

PUBLICATIONS

Dubois, 1984, Research Department Technical Bulletin, vol. VI, Issue 1, pp. 1, 4 and 5.
Doerry et al, 1984, Research Department Technical Bulletin, vol. VI, Issue 3, pp. 1, 7 and 8.
Sultan, 1976, Practical Baking, AVI Publishing Co., Westport, CT, pp. 126–133.
D. Tressler et al, 1975, Food Products Formulary, vol. 2, AVI Publishing Co., Westport, CT, pp. 211–213.
E. Pyler, 1973, Baking Science and Technology, Siebel Publishing Co., Chicago, Ill., pp. 578–584 and 672–681.

*Primary Examiner*—Raymond N. Jones
*Assistant Examiner*—Carolyn Paden
*Attorney, Agent, or Firm*—Neal Kalishman

[57] ABSTRACT

A process for making frozen bagels is disclosed. The use of a combination of oxidizers and boiling without baking prior to freezing a contribute to a frozen bagel having excellent shelf life and, when baked, have the same characteristics of fresh bagels.

9 Claims, No Drawings

METHOD OF MANUFACTURING FROZEN BAGEL DOUGH PRODUCTS

BACKGROUND OF THE INVENTION

Bread products are an important food for proper nutrition. One popular bread product is known as a bagel. Bagels are commonly hard rolls which are shaped like a donut i.e. circular with a hole in the center. They are made of raised dough in a process which includes simmering in boiling water which is followed by baking. The plain bagel has a glazed browned hard exterior over a firm white interior. The plain bagel can be varied by the addition of toppings and/or fillings or by selection of special dough, such as, pumpernickel.

The manufacture of bagels is a highly skilled specialized art. Normal baking techniques are not applicable to the production of bagels. Also, the shelf life of a baked bagel is relatively short. Therefore, the availability of fresh bagels is limited.

The consumer demand for bagels over the years has increased dramatically, it has become important for supermarkets to be able to meet this demand through a supply of fresh bagels. Due to the skill needed to manufacture a bagel, the supermarkets are not able to fill this demand through its store bakeries. Many supermarkets are able to internally fulfill their entire fresh bakery needs except for bagels and croissants. The supermarkets have been required to purchase estimated quantities from local bakeries or reheat pre-baked frozen bagels.

Purchasing bagels from local bakeries has proved unsatisfactory due to the need to estimate quantities in order to avoid having too many extra stale bagels. The problem with the frozen pre-baked bagels is that once they are reheated, the bagels become extremely hard within several hours. This creates serious consumer dissatisfaction because the bagels are inedible by the time the consumer is prepared to consume the bagels. Therefore, there is a pressing need for a bagel which can be stored at a supermarket for long periods and freshly prepared as needed.

Others have recognized this problem but have been unsuccessful in producing a commercially acceptable product. Those who have attempted to solve this problem have produced bagels with an undesirable taste and/or which do not look like a proper bagel since they have a blistery exterior. Thus, leaving the problem unsolved until the present invention.

As reference the following is a typical procedure for manufacturing bakery bagels:

1. The following ingredients are put into a mixer containing a dough hook and mixed for 8-10 minutes at room temperature (60-95 degrees F.):
   (a) 100 lbs. of high gluten bleached malted barley flour;
   (b) 48 lbs. water;
   (c) 6 lbs. sugar or 2 lbs. malt;
   (d) 2 lbs. salt;
   (e) 4½ lbs. vegetable oil (optional); and
   (f) 4 oz. to 1 lb. yeast.
2. When the dough has reached an extendable condition i.e. won't tear during molding since it is stretchable it is placed on a pan.
3. From the pan it is either hand shaped into bagels or placed in a divider and then into a former. The divider separates the dough into bagel size portions and the former shapes the dough into the donut shape.
4. The shaped dough pieces are placed on pans which have been coated with corn meal to prevent sticking.
5. The dough pieces are either placed in a refrigerator (40 degrees F.) for storage or allowed to proof or rise at room temperature for 45 minutes to two hours (if refrigerated they must be brought back to room temperature before further processing).
6. The dough pieces are next cooked in water at 212 degrees F. for 30 seconds to 2 minutes until they float on the surface of the water. This provides the hard shining exterior surface and cleans off the corn meal.
7. The bagels are dried and then baked for 20 minutes at 380 degrees F. For appearance prior to baking they may be washed in solution containing 50% by volume raw whole eggs and 50% by volume water. These washed bagels may be coated with a topping, such as, poppy seeds.

The commercially available frozen process is similar to the preceding. It is believed that one of the major differences is that the dough is "relaxed" between the divider and the former. It is protected from the outside air for five to ten minutes in order to allow the dough to again become extendable. It also appears to differ by not fully baking the bagel in the factory and the bagel is frozen prior to shipping. When the bagel is thawed in the supermarket the manufacturer recommends that the bagel be treated with heat and humidity prior to final baking. These bagels have a very short commercial shelf life since after 4 to 6 hours they are too difficult to chew.

The present invention advantageously provides a means of manufacturing frozen bagels which can be shipped from a central plant to distant retail outlets. An advantage of these bagels is that they can be baked at the retail outlet to obtain bagels which exhibit bakery freshness. The frozen dough has excellent shelf life characteristics and allows complete inventory and cost control. A further advantage is that they have better taste, texture and appearance as a bagel produced by traditional methods.

SUMMARY OF THE INVENTION

The invention involves a frozen dough which has been boiled but not baked. It has at least a one month shelf life in the frozen state. When it is baked it produces a bagel that remains soft and easily chewable for at least 6 hours and has no blisters.

The invention also involves a process for preparing such a frozen dough product. This process includes the steps of mixing the ingredients, dividing the dough and forming the bagel shapes, placing said shapes in a heated proofer and a wet proofer sequentially, boiling said shapes, and freezing the shapes.

DESCRIPTION OF THE PREFERRED EMBODIMENTS

The present invention provides a means of manufacturing frozen bagel dough which when baked have all of the characteristics of fresh bakery bagels. This was not true of previous attempts or of the partially baked and then frozen bagel products currently available. The frozen dough of the present invention has a shelf life of at least one month. Usually the shelf life of the products is over 4 months.

Preferably the dough ingredients are based on the following formula:

| INGREDIENT | LBS. |
| --- | --- |
| Flour | 100 |
| Water | 45 |
| Sugar | 5 |
| Salt | 1½ |
| Vegetable Oil | 5 |
| Yeast | 2½ |
| Ascorbic Acid | .1 |
| Potassium Bromate | .003 |
| BETA | .06 |
| Calcium Peroxide | .03 |
| Calcium Propionate | .3 |

The flour is conventional high gluten bleached barley flour. It is typically brominated at a level of 15 parts per million. The additional potassium bromate is added to raise the bromate level by approximately 30 to 45 parts per million. Calcium bromate could be substituted or the flour could be prebromated to the desired levels.

The bromate acts as an oxidizer in the baking stage. It improves gas retention and strengthens the dough. In strengthening the dough it allows the dough to withstand mechanical forces.

The sugar levels are determined by taste. Malt is a common substitute for the sugar. Sugar feeds the yeast so that the dough will rise. In order to balance the sugar, enzymes are sometimes added.

The level of salt will vary with taste. The salt retards the yeast action. Milk powder is a known substitute for salt. With respect to the yeast, reconstituted instant yeast can be used as a substitute.

There are a number of substitutes for vegetable oil. These include shortening and other types of food grade oils. Other well known common ingredients may be added as needed.

Beta is a reducing agent containing sodium metabisulfate, starch and other edible excipients. A common substitute is L-cysteine. The agent produces rapid relaxation of the dough. It can react with the bromate and so should be added separately from the bromate. It prevents the dough from tearing during processing.

Either calcium or sodium propionate can be used. They act as a mold retarder. The calcium peroxide which also contains soya flour, diammonium phosphate, and tricalcium phosphate acts as a dough conditioner. It improves the dough's handling characteristics by producing a drier dough with fewer stickups. This product is known commercially as DRIZE "P" and EMPLEX is a well known commercial substitute.

An important ingredient in the formulation is the addition of ascorbic acid or vitamin C. It is known as an intermediate oxidation agent and dough conditioner. It promotes the cell formation during the early mixing and proofing stage. Further, it is believed that the ascorbic acid provides extended freezer shelf life for the bagel dough. Without the ascorbic acid the frozen dough becomes old i.e. blistered and small in the freezer within 24 hours. Possible substitutes include potassium iodate and calcium iodate.

The ingredients are mixed in a mixer with a dough hook for approximately ten minutes. The dough develops a workable feel and is at a temperature of approximately 85 degrees F. It then goes through a divider and former to produce individual bagel shapes. The dough should be processed within 20-25 minutes of mixing. The bagel shapes are then transported to a heated proofer along an open conveyor for 90 seconds. While traveling each of the bagel shapes are flipped. The plant air is approximately 72 degrees F. and 50% relative humidity.

The bagel shaped dough enters a heated proofer. The proofer is a box in which the temperature is approximately 110 degrees F. and 50% relative humidity. The bagels remain in the box for approximately six minutes. The bagels then pass through the ceiling section of the plant which is approximately 85 degrees F. and 50% relatively humidity for 90 seconds.

The bagels then enter a wet proofer which exposes the bagels to hot moist conditions. The wet proofer seals the bagel surfaces by exposing them to a hot moist steam. The proofer or box temperature is about 90 degrees F. with 90% relative humidity. The bagels remain in the box for 45 seconds.

The bagels are then cooked in boiling water (212 degrees F.) for 25 to 30 seconds. It is believed that this cooking step in combination with the above formula provide the unique product characteristics. They are quick frozen by placing them in a −15 degree F. freezer for 1 hour within 8 minutes of their being removed from the boiling water. They are packaged and stored at −15 degrees F. They can remain in this state for four or more months.

When they are to be sold by a retailer they are allowed to stand at room temperature for thirty to forty minutes or placed in a proof box for twenty minutes, 100 degrees F. humidity 90%. They are then washed with a solution of 50% raw whole egg and 50% water. A topping can be added and they are baked for 20-25 minutes. A bakery fresh bagel is obtained which has a store shelf life comparable to any other just baked bagel of at least 6 hours. Typically the products are still chewy when left uncovered at room temperature for 48 hours. This is compared to other bagel products which are baked prior to freezing and have a very short store shelf life. Naturally, heat and humidity can extend the life of a bagel product.

The present process produces a product which is different from other frozen dough products. Due to the final boiling, the bagels are preproofed. The product does not have to be thawed to room temperature nor does moisture have to be added to the product prior to baking. The frozen bagel of the invention displays unique characteristics that are not predictable from other frozen dough products. Thus, confirming that the method of making bagels is not comparable to other frozen dough processes and that general baking techniques are not applicable to the manufacturing of bagels.

Although other bakery products are not normally boiled prior to baking, it is believed that the present invention could be applicable to certain other products. For instance, the process of the invention could make it advantageous to boil certain types of breads and rolls prior to freezing in order to obtain the shelf life and product stability characteristics of the invention.

We claim:
1. A process for manufacturing frozen dough products comprising the steps of:
   (a) mixing the ingredients which contain a first oxidizer that reacts with the flour during the early mixing stage and a second oxidizer which reacts with the flour during baking until said dough develops a workable feel;
   (b) dividing and forming the dough into product shapes;

(c) proofing said product shapes until said dough is relaxed;

(d) boiling said shapes; and (e) freezing said shapes.

2. The process of claim 1 wherein said boiling occurs at approximately 200 degrees F. for 25 to 30 seconds.

3. The process of claim 1 wherein said freezing occurs at approximately −15 degrees F.

4. The process of claim 1 wherein said first oxidizer is ascorbic acid.

5. The method of claim 1 wherein said shapes are subsequently washed with a solution of raw egg and water and then baked.

6. The process of claim 1 wherein said second oxidizer is potassium bromate.

7. The process of claim 1 wherein said frozen dough shapes are bagels.

8. The process of claim 1 which further comprises baking said shapes until no longer raw.

9. The process of claim 1 wherein the proofing of said product shapes comprises exposing said shapes to heat and moisture.

* * * * *

UNITED STATES PATENT OFFICE
CERTIFICATE OF CORRECTION

Patent No. 4,657,769　　　　　　　　Dated　April 14, 1987

Inventor(s)　David Petrofsky et al

It is certified that error appears in the above-identified patent and that said Letters Patent are hereby corrected as shown below:

Page 1, Column 1, change the identity of the inventors to delete "Robert Petrofsky" and add -- Leonard Petrofsky --.

Page 1, Column 1, change the date filed from "Feb. 22, 1984" to -- Feb. 22, 1985 -- .

Signed and Sealed this

Twenty-seventh Day of October, 1987

Attest:

DONALD J. QUIGG

Attesting Officer　　　　Commissioner of Patents and Trademarks